United States Patent
Dal Zotto et al.

(10) Patent No.: US 11,558,544 B1
(45) Date of Patent: Jan. 17, 2023

(54) FIELD OF VIEW LIMITS OF IMAGE SENSORS

(71) Applicant: HEWLETT-PACKARD DEVELOPMENT COMPANY, L.P., Spring, TX (US)

(72) Inventors: Rafael Dal Zotto, Porto Alegre (BR); Hiren Bhatt, Wilmington, DE (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/384,579

(22) Filed: Jul. 23, 2021

(51) Int. Cl.
*H04N 5/232* (2006.01)
*H04N 5/272* (2006.01)
*G06V 10/75* (2022.01)

(52) U.S. Cl.
CPC ....... *H04N 5/23219* (2013.01); *G06V 10/751* (2022.01); *H04N 5/272* (2013.01)

(58) Field of Classification Search
CPC ............... H04N 5/23219; H04N 5/272; G06V 10/751
See application file for complete search history.

(56) References Cited

U.S. PATENT DOCUMENTS

| 9,549,125 B1* | 1/2017 | Goyal ................... G06V 10/25 |
| 2005/0128333 A1* | 6/2005 | Park ................. H04N 5/232945 |
| | | 348/333.12 |

* cited by examiner

*Primary Examiner* — Yogesh K Aggarwal
(74) *Attorney, Agent, or Firm* — Quarles & Brady LLP

(57) ABSTRACT

In some examples, an electronic device comprises an image sensor and a processor. The processor is to detect a feature of a frame of a video received via the image sensor, determine whether the feature indicates an object of interest, and, responsive to a determination that the feature indicates the object of interest, limit a first field of view of the image sensor to the object of interest and overlay the first field of view with a second field of view. The second field of view is unlimited.

13 Claims, 6 Drawing Sheets

FIELD OF VIEW LIMITS OF IMAGE SENSORS

BACKGROUND

Electronic devices such as notebooks, laptops, desktops, tablets, and smartphones may include executable code that enables users to share livestreamed videos during virtual interactions (e.g., videoconferencing applications, social media applications). A virtual interaction, as used herein, may be any online event that allows a user of an electronic device to interact with users of other electronic devices via an image sensor, an audio device, or a combination thereof. A shared livestreamed video may include an object of interest that the user wants to exhibit to the audience by presenting the object of interest to the image sensor.

BRIEF DESCRIPTION OF THE DRAWINGS

Various examples are described below referring to the following figures.

DETAILED DESCRIPTION

Figure 1:
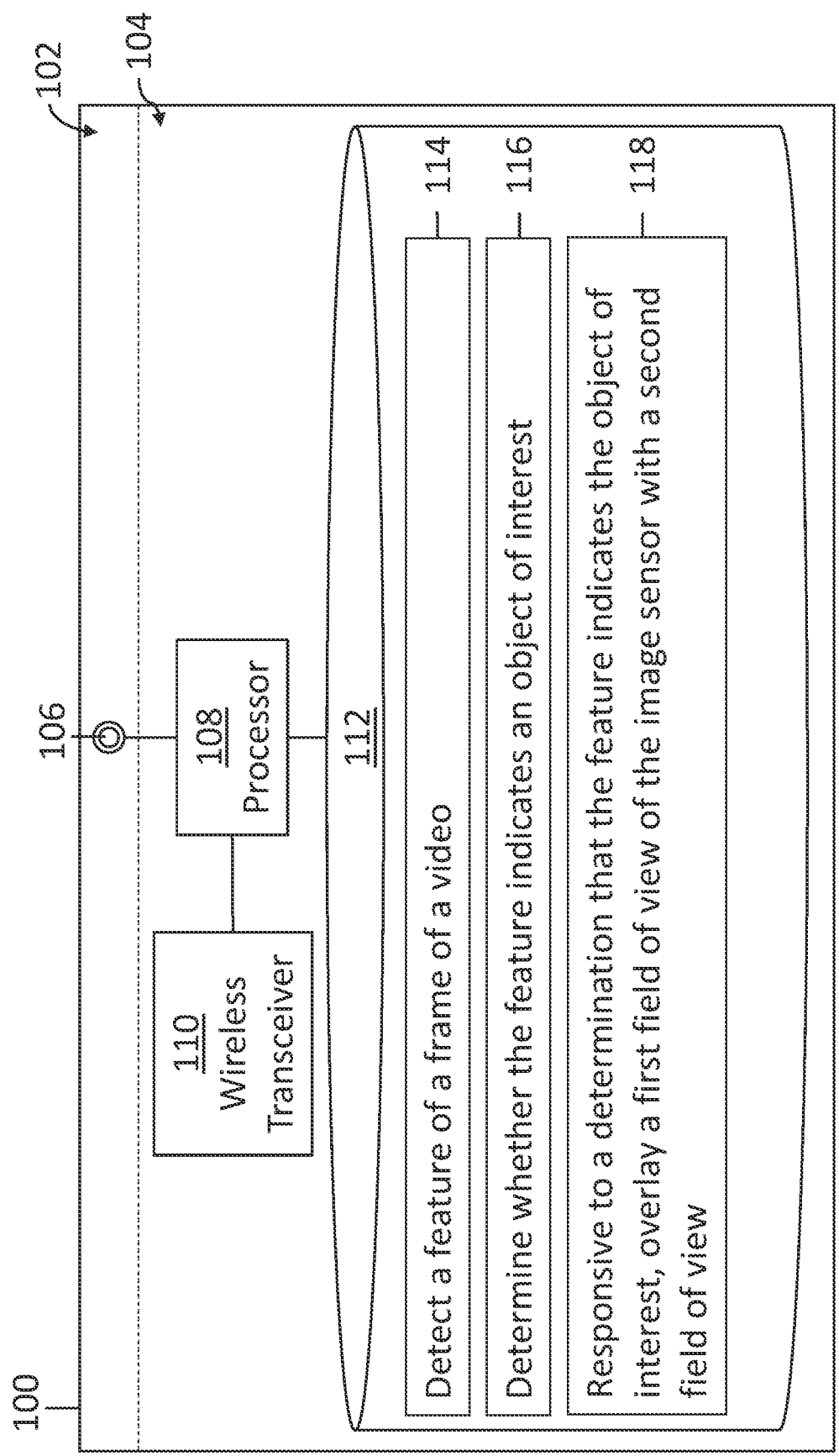
FIG. 1 is a block diagram of an electronic device for limiting a field of view of an image sensor in accordance with various examples.

As described above, electronic devices such as notebooks, laptops, desktops, tablets, and smartphones may include executable code that enables users to share objects of interest with an audience via image sensors. An object of interest, as used herein, is a tangible item that the user exhibits to the audience. The object of interest may be a book, a phone, a framed picture, or a gadget, for instance. However, in addition to the object of interest, the image sensor may capture other tangible items (e.g., the user, a piece of furniture, a wall decoration, a table decoration) in a field of view of the image sensor. A field of view, as used herein, is an area that the image sensor detects given an orientation and a position of the image sensor within a physical environment. Displaying tangible items other than the object of interest may distract the user and the audience and disrupt the virtual interaction.

This description describes an electronic device that analyzes a frame of a livestream video received via an image sensor to determine an object of interest and limits the field of view of the image sensor to the object of interest. Limiting a field of view, as used herein, reduces an area, or portion, of the physical environment, that the image sensor may record for display to an audience. The livestream video is hereafter referred to as "the video." The electronic device decomposes a frame of the video to detect features of the frame. The frame of the video is a static image taken from the video. Decomposing, as used herein, is to reduce the frame to its edge-like structures by removing fine-scale details of the tangible items of the frame. Features, as used herein, are the edge-like structures, or outlines, of the tangible items of the frame. The electronic device determines which of the features represents the object of interest. The electronic device may prompt a user to verify a tangible item represented by the determined feature is the object of interest. The electronic device may limit the field of view of the image sensor that is displayed to the audience to the object of interest. Utilizing the electronic device that enables sharing of a video having a field of view limited to an object of interest provides for an enhanced user and audience experience by focusing the user and the audience attention on the object of interest.

In some examples in accordance with the present description, an electronic device is provided. The electronic device includes an image sensor and a processor. The processor is to detect a feature of a frame of a video received via the image sensor, determine whether the feature indicates an object of interest, and, responsive to a determination that the feature indicates the object of interest, limit a first field of view of the image sensor to the object of interest and overlay the first field of view with a second field of view, the second field of view unlimited.

In other examples in accordance with the present description, an electronic device is provided. The electronic device includes an image sensor and a processor. The processor is to detect multiple features of a frame of a video received via the image sensor, determine that a first subset of the multiple features represents a first object and a second subset of the multiple features represents a second object, determine whether the first object is an object of interest, and, based on a determination that the first object is the object of interest, limit a field of view of the image sensor to the first object and exclude the second object.

In yet other examples in accordance with the present description, a non-transitory machine-readable medium is provided. The non-transitory machine-readable medium includes all electronic mediums or media of storage, except signals. The non-transitory machine-readable medium stores machine-readable instructions. When executed by a processor of an electronic device, the machine-readable instructions cause the processor to detect a user gesture in a video signal received via the image sensor, determine that the user gesture indicates that the video signal comprises an object of interest, detect multiple features of a frame of the video signal, determine, utilizing a machine learning technique, a subset of features of the multiple features indicates the object of interest, and limit a field of view of the image sensor to the subset of features.

Referring now to FIG. 1, an electronic device 100 for limiting a field of view of an image sensor 106 is provided, in accordance with various examples. The electronic device 100 may be a notebook, a laptop, a desktop, a tablet, a smartphone, or any other suitable computing device including executable code that enables users to share videos during virtual interactions. The electronic device 100 may include a chassis 102. The chassis 102 may house hardware components of the electronic device 100 such as a display panel 104, the image sensor 106, a processor 108, a wireless transceiver 110, and a storage device 112. The chassis 102 may be plastic, glass, glass coated with a conductive material, or a combination thereof. The display panel 104 and the image sensor 106 may be housed on an outer surface of the chassis 102. The processor 108, the wireless transceiver 110, and the storage device 112 are housed within the chassis 102. The display panel 104 may be a liquid crystal display (LCD) panel, a light-emitting diode (LED) display panel, a plasma display panel, a quantum dot (QD) display panel, or any suitable panel for displaying data of the electronic device 100 for viewing. The image sensor 106 may be any suitable device for generating a video signal. The processor 108 may be a microprocessor, a microcomputer, a microcontroller, a programmable integrated circuit, a programmable gate array, or another suitable device for managing operations of the electronic device 100. The wireless transceiver 110 is to transmit and receive wireless signals. The wireless transceiver 110 may transmit and receive a BLUETOOTH® signal, a WI-FI® signal, or a combination thereof, for example. The storage device 112 may include a hard drive, solid state drive (SSD), flash memory, random access memory (RAM), or other suitable memory for storing data or executable code of the electronic device 100.

In some examples, the processor 108 couples to the display panel 104 (connection not explicitly shown), the image sensor 106, the wireless transceiver 110, and the storage device 112. The storage device 112 may store machine-readable instructions which, when executed by the processor 108, cause the processor 108 to perform some or all of the actions attributed herein to the processor 108. The machine-readable instructions may be the machine-readable instructions 114, 116, 118.

In various examples, when executed by the processor 108, the machine-readable instructions 114, 116, 118 cause the processor 108 to limit the field of view of the image sensor 106. The machine-readable instruction 114 causes the processor 108 to detect a feature of a frame of a video. The processor 108 may receive the video via the image sensor 106. The machine-readable instruction 116 causes the processor 108 to determine whether the feature indicates an object of interest. Responsive to a determination that the feature indicates the object of interest, the machine-readable instruction 118 causes the processor 108 to overlay a first field of view of the image sensor 106 with a second field of view of the image sensor 106.

As described above, in some examples, the electronic device 100 analyzes a frame of a video received via the image sensor 106 to determine an object of interest and limits the field of view of the image sensor 106 to the object of interest. The frame of the video may be an image of a user holding a tangible item, for example. The machine-readable instruction 114 may cause the processor 108 to decompose a frame of the video to detect the feature of the frame, for example. The processor 108 may decompose the frame utilizing image pre-processing techniques. The image pre-processing techniques may include grayscaling, blurring, thresholding, dilating, erosion, or a combination thereof. For example, the processor 108 may convert the frame to a grayscale image. The grayscale image has color removed to enhance the feature of the frame. The processor 108 may blur the grayscale image to remove noise from the grayscale image. The processor 108 may threshold the blurred image to convert the blurred image into black and white pixels. The processor 108 may determine that the white pixels indicate the feature of the frame. In various examples, the processor 108 may dilate (e.g., add pixels to), erode (e.g., remove pixels from), or a combination thereof the thresholded image to enhance the feature of the frame.

The processor 108 may determine whether the feature indicates the object of interest by prompting a user to verify that the tangible item represented by the feature indicates the object of interest, performing a feature comparison, or a combination thereof. For example, the decomposed frame may include the feature, and the machine-readable instruction 116 causes the processor 108 to determine whether the feature indicates the object of interest by prompting the user to verify that the tangible item represented by the feature indicates the object of interest. The processor 108 may prompt the user to verify that the tangible item represented by the feature indicates the object of interest by causing the display panel 104 to display a field of view of the image sensor 106 limited to the tangible object represented by the feature.

In other examples, the machine-readable instruction 116 causes the processor 108 to determine whether the feature indicates the object of interest by performing a feature comparison. The feature comparison may compare a location of the feature relative to a central axis of the image sensor 106, a dimension of the feature to a dimension of the field of view of the image sensor 106, or a combination thereof. The central axis of the image sensor 106, as used herein, is an imaginary line through the center of curvature of a lens of the image sensor 106.

For example, the processor 108 may determine the location of the feature relative to the central axis of the image sensor 106 by determining whether the feature is within a specified area of the central axis of the image sensor 106. The specified area may be demarcated by an angle that radiates outward from the image sensor 106, by an orthogonal coordinate system having the central axis of the image sensor 106 as an axis of the orthogonal coordinate system, or a combination thereof, as described below with respect to FIG. 2B. The processor 108 may determine that because the location of the feature indicates that the user is presenting the tangible item represented by the feature with the specified area the feature indicates the object of interest.

In another example, the processor 108 may compare the dimension of the feature to the dimension of the field of view of the image sensor 106. The processor 108 may determine that the dimension of the feature relative to the dimension of the field of view indicates that the user is presenting the tangible item represented by the feature in close proximity to the image sensor 106. For example, the processor 108 may determine that the feature indicates the object of interest because the dimension of the feature exceeds twenty-five percent of the dimension of the field of view.

Responsive to the processor 108 determining that the feature indicates the object of interest, the machine-readable instruction 118 causes the processor 108 to overlay a first field of view of the image sensor 106 with a second field of view of the image sensor 106. In some examples, the processor 108 limits a first field of view of the image sensor 106 to the object of interest and overlays the first field of view with a second field of view. The second field of view is an unlimited field of view of the image sensor 106. In some examples, the processor 108 receives the video via the image sensor 106. The video is a video of the unlimited field of view of the image sensor 106. The processor 108 modifies the video so that the limited field of view is overlaid by the unlimited field of view. The processor 108 may cause the display panel 104 to display the limited field of view overlaid with the unlimited field of view. In other examples, the processor 108 may cause the wireless transceiver 110 to transmit the video comprising the limited field of view overlaid with the unlimited field of view. The limited field of view of the image sensor 106 overlaid with the unlimited field of view of the image sensor 106 may be referred to herein as a "picture-in-picture video." A dimension of the unlimited field of view that is displayed or transmitted may be a percentage of the limited field of view. For example, the dimension of the unlimited field of view may be a tenth to a quarter of the dimension of the limited field of view. The unlimited field of view may be located in a specified zone of the limited field of view, as described below with respect to FIG. 2C.

In other examples, the processor 108 the first field of view is an unlimited field of view of the image sensor 106 and the second field of view is the field of view of the image sensor 106 limited to the object of interest. The processor 108 modifies the video of the unlimited field of view so that the unlimited field of view is overlaid by the limited field of view. The processor 108 may cause the display panel 104 to display the unlimited field of view overlaid with the limited field of view. In other examples, the processor 108 may cause the wireless transceiver 110 to transmit the video comprising the unlimited field of view overlaid with the limited field of view. A dimension of the limited field of view that is displayed or transmitted may be a percentage of the unlimited field of view. For example, the dimension of the limited field of view may be a tenth to a quarter of the dimension of the unlimited field of view. The limited field of view may be located in a specified zone of the unlimited field of view. In various examples, the user may determine whether the picture-in-picture video is the limited field of view overlaid with the unlimited field of view or the unlimited field of view overlaid with the limited field of view.

While not explicitly shown, the electronic device 100 may also include a video adapter, a sound card, a network card, local buses, input/output devices (e.g., a microphone, a speaker, a mouse, a keyboard, a touchpad), or a combination thereof. While the display panel 104 is shown as an integrated display panel 104 of the electronic device 100, in other examples, the display panel 104 may be a display panel 104 of a display device that is coupled to the electronic device 100 via a wired connection (e.g., Universal Serial Bus (USB), Video Graphics Array (VGA), Digital Visual Interface (DVI), High-Definition Multimedia Interface (HDMI)) or via a wireless connection to the wireless transceiver 110. In some examples, the display panel 104 may be a flexible display panel. A flexible display panel, as used herein, is a display panel that may be deformed (e.g., rolled, folded, etc.) within a given parameter or specification (e.g., a minimum radius of curvature) without losing electrical function or connectivity. While the image sensor 106 is shown as an internal camera, in other examples, the image sensor 106 may couple to the processor 108 via a wired connection (e.g., USB) or via a wireless connection to the wireless transceiver 110.

Figure 2C:
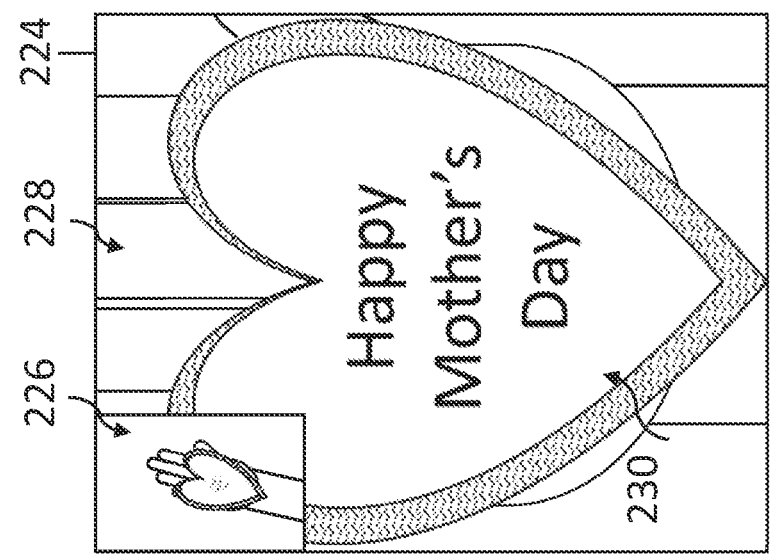
FIGS. 2A, 2B, and 2C are an example of an electronic device limiting a field of view of an image sensor in accordance with various examples.
Figure 2B:
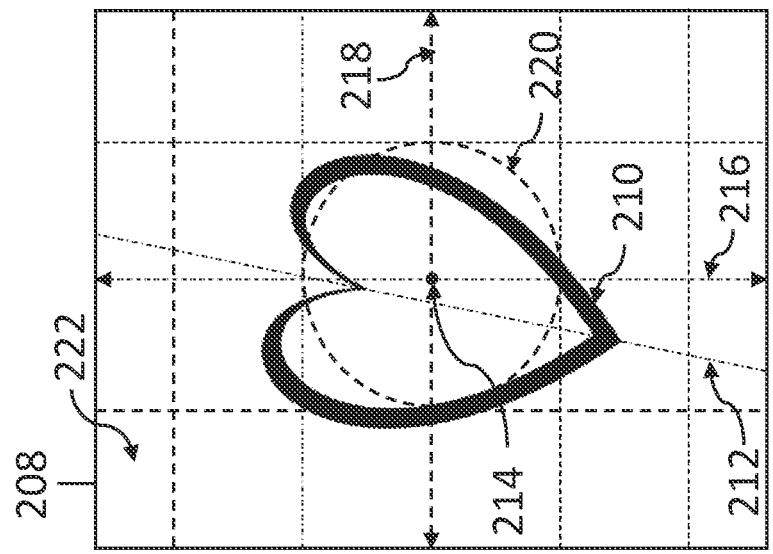
Figure 2A:
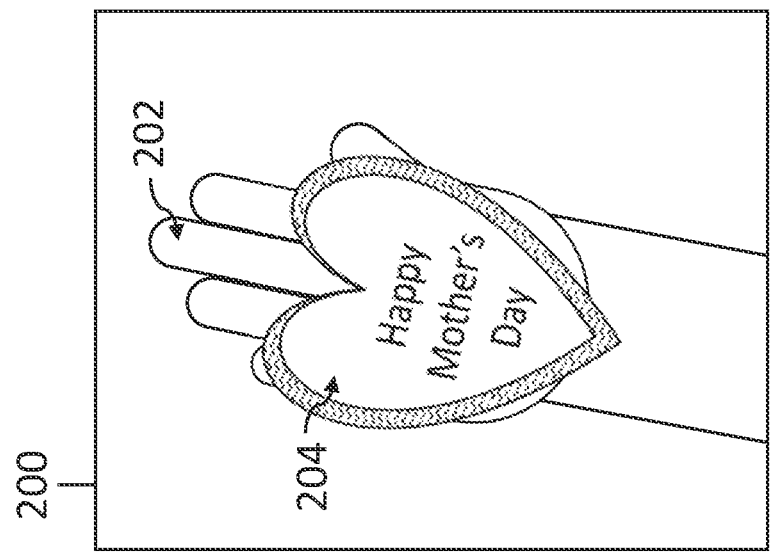

Referring now to FIGS. 2A, 2B, and 2C, an example of an electronic device (e.g., the electronic device 100) limiting a field of view of an image sensor (e.g., the image sensor 106) is provided, in accordance with various examples. FIG. 2A includes the electronic device displaying an image 200. The image 200 is an unlimited field of view of the image sensor. The image 200 includes a user hand held in a gesture 202 and a tangible item 204. The tangible item 204 may be a Mother's Day card or a Mother's Day decor item, for example. FIG. 2B includes a decomposed image 208. The decomposed image 208 is a decomposition of the image 200. The decomposed image 208 includes a feature 210, a central axis 212 of the feature 210, a point 214, a first axis 216, a second axis 218, a boundary 220, and a zone 222. The feature 210 represents the tangible item 204. The point 214 represents the central axis of the image sensor. The first axis 216 and the second axis 218 may be axes of an orthogonal system having the central axis of the image sensor as a third axis. The boundary 220 represents an angle that radiates outward from the image sensor and intersects the feature 210. The zone 222 represents an area within the orthogonal system. FIG. 2C includes an image 224. The image 224 includes an image 226, the user hand held in a gesture 228, and a tangible item 230. The image 226 may be the image 200. The gesture 228 may be the gesture 202. The tangible item 230 may be the tangible item 204.

As described above, in various examples, a processor (e.g., the processor 108) of the electronic device detects a feature of a frame of a video. For example, the frame may be the image 200 of FIG. 2A. The processor may decompose the image 200 to detect the feature. As shown in FIG. 2B, the decomposed image 208 includes the feature 210, which is an outline of the tangible item 204. The processor determines whether the feature 210 indicates the object of interest by prompting a user of the electronic device to verify that the tangible item 204 is the object of interest, by comparing a location of the feature 210 relative to the point 214, by comparing a dimension of the feature 210 to the dimension of a field of view of the image sensor, or a combination thereof. For example, the processor may determine that the feature 210 intersects the boundary 220 that represents a twelve-degree angle that radiates outward from the image sensor, a proportion of the dimension of the feature 210 to the dimension of the field of view is twenty-five percent, or a combination thereof. Based on the angle having a value that is less than or equal to thirty degrees, the proportion having a value that is greater than twenty percent, or a combination thereof, the processor may prompt the user to verify that the tangible item 204 represented by the feature 210 is the object of interest. Responsive to a determination that the feature 210 indicates the object of interest, the processor limits the field of view of the image sensor, as shown in FIG. 2C, to the image 224 to emphasize the tangible item 230 and overlays the image 224 with the image 226. The image 226 is the unlimited field of view of the image sensor (e.g., the image 200 of FIG. 2A). The image 226 may be located in the zone 222 of the image 224. By providing the limited field of view of the image sensor, the electronic device may enlarge a perspective of the object of interest to enhance a demonstration of a functionality of the object of interest, a particular view of the object of interest, or a combination thereof, thereby enhancing the user and audience experience.

In some examples, the processor may perform post-processing techniques to reorient the limited field of view of FIG. 2C. The post-processing techniques may include warping a perspective, adjusting a resolution, or a combination thereof. In various examples, the processor may warp the perspective of an image including an object of interest so that an angle of the central axis of the object of interest aligns with an axis of the orthogonal system of a decomposed frame. As shown in FIG. 2C, the processor reorients the image 224 so that the central axis of the tangible item 230 (e.g., the central axis 212 of the feature 210) is parallel to the first axis 216 of FIG. 2B. In other examples, the processor may adjust a resolution of the video to enhance a quality of the video. For example, the processor may apply super resolution to the limited field of view, which is a cropped image of the unlimited field of view, so that the limited field of view is similar in quality to a resolution of the unlimited field of view. In various examples, the image 226 is located in other zones of the image 224 to reduce overlap with the object of interest. By adjusting an orientation of the image 224, a size of the image 224, a location of the image 226, or a combination thereof, the processor may enhance a readability of the object of interest, thereby enhancing the user and audience experience.

While the boundary 220 is shown centered around the point 214, in other examples, the boundary 220 may be located in other areas of the field of view of the image sensor. For example, the processor may utilize a machine learning technique to determine that the user exhibits objects of interest in an upper left quadrant of the orthogonal system of FIG. 2B. The processor may determine the boundary 220 is located in the upper left quadrant of the orthogonal system of FIG. 2B. While the examples above utilize the orthogonal system of FIG. 2B to analyze the frame, in other examples, the processor may utilize a different system for analyzing three-dimensional (3D) objects of a video in a two-dimensional (2D) frame of the video.

Figure 3:
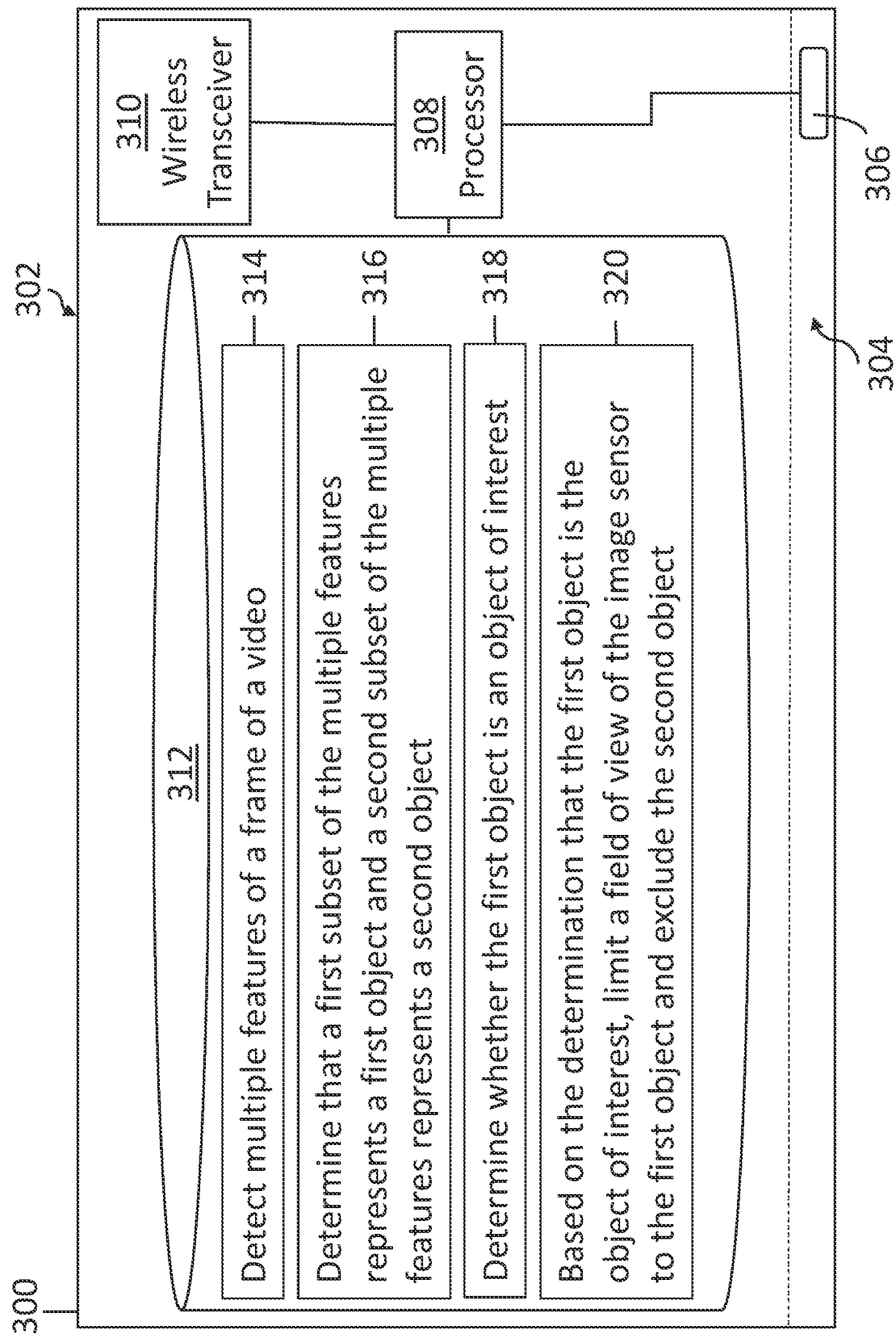
FIG. 3 is a block diagram of an electronic device for limiting a field of view of an image sensor in accordance with various examples.

Referring now to FIG. 3, an electronic device 300 for limiting a field of view of an image sensor (e.g., the image sensor 106) is provided, in accordance with various examples. The electronic device 300 may be the electronic device 100. The electronic device 300 may include a chassis 302. The chassis 302 may be the chassis 102. The chassis 302 may have an outer surface 304. The outer surface 304 may provide access to a connector 306. The connector 306 may be any suitable connector for coupling to the image sensor. For example, the connector 306 may be a USB connector. The chassis 302 may house hardware components of the electronic device 300 such as a processor 308, a wireless transceiver 310, and a storage device 312. The processor 308 may be the processor 108. The wireless transceiver 310 may be the wireless transceiver 110. The storage device 312 may be the storage device 112.

In some examples, the processor 308 couples to the connector 306, the wireless transceiver 310, and the storage device 312. The storage device 312 may store machine-readable instructions which, when executed by the processor 308, cause the processor 308 to perform some or all of the actions attributed herein to the processor 308. The machine-readable instructions may be the machine-readable instructions 314, 316, 318, 320.

In various examples, when executed by the processor 308, the machine-readable instructions 314, 316, 318, 320 cause the processor 308 to limit the field of view of the image sensor to an object of interest. The image sensor may couple to the connector 306 or wirelessly couple to a wireless transceiver 310. The machine-readable instruction 314 causes the processor 308 to detect multiple features of a frame of a video. The processor 308 may receive the video via the image sensor. The machine-readable instruction 316 causes the processor 308 to determine which subset of features of the multiple features represent a first tangible item, or a first object, and a second tangible item, or a second object. The machine-readable instruction 318 causes the processor 308 to determine whether the first object is the object of interest. The machine-readable instruction 320 causes the processor 308 to, based on the determination that the first object is the object of interest, limit a field of view of the image sensor.

As described above, in some examples, the electronic device 300 analyzes a frame of a video received via the image sensor to determine the object of interest and limits the field of view of the image sensor to the object of interest. The machine-readable instruction 314 may cause the processor 308 to decompose a frame of the video to detect the multiple features of the frame. As described above, the processor 308 may decompose the frame utilizing image pre-processing techniques such as grayscaling, blurring, thresholding, dilating, erosion, or a combination thereof. Responsive to the decomposed frame including multiple features, the machine-readable instruction 316 may cause the processor 308 to determine that a first subset of the multiple features represents the first object and a second subset of the multiple features represents the second object by identifying connected subsets of the multiple features. A connected subset of the multiple features, as used herein, is a group of pixels of the decomposed frame having a same value (e.g., a same color) and that touch in a contiguous manner to form an outline.

The machine-readable instruction 318 may cause the processor 308 to determine whether the first object is the object of interest by performing a feature comparison, a frame-by-frame feature comparison, or a combination thereof. The feature comparison may compare a location of the first object relative to a central axis of the image sensor and a location of the second object relative to the central axis of the image sensor, a dimension of the first object to a dimension of the second object, the location of the first object relative to the location of the second object, or a combination thereof.

For example, the processor 308 may determine the location of the first subset of the multiple features relative to the central axis of the image sensor by determining a distance from a center point of the first subset of the multiple features and the central axis of the image sensor. The processor 308 may determine distances for multiple subsets of the multiple features. The processor 308 may determine that a distance of the first subset of the multiple features indicates that the user is presenting the tangible item represented by the first subset of the multiple features nearest to the central axis of the image sensor. The processor 308 may prompt the user to verify that the tangible item represented by the first subset of the multiple features indicates the object of interest by causing a display panel (e.g., the display panel 104) to display a field of view of the image sensor limited to the tangible item represented by the first subset of the multiple features.

In some examples, the machine-readable instruction 318 causes the processor 308 to determine whether the first subset of the multiple features indicates the object of interest by performing a frame-by-frame feature comparison. Performing the frame-by-frame feature comparison, the processor 308 utilizes feature comparison to compare multiple subsets of the multiple features between multiple frames. In various examples, the processor 308 may determine that a feature is changing positions between frames. The processor 308 may determine that stationary features are background objects in the image and that the feature that is changing positions represents the object of interest. In other examples, the processor 308 may determine that a first feature that is present in sequential frames is the object of interest because a second feature that is present in a first frame of the sequential frames is absent from a second frame of the sequential frames. In some examples, the machine-readable instruction 320 causes the processor 308 to, based on the determination that the first object is the object of interest, limit a field of view of the image sensor to the first object and exclude the second object.

Figure 4C:
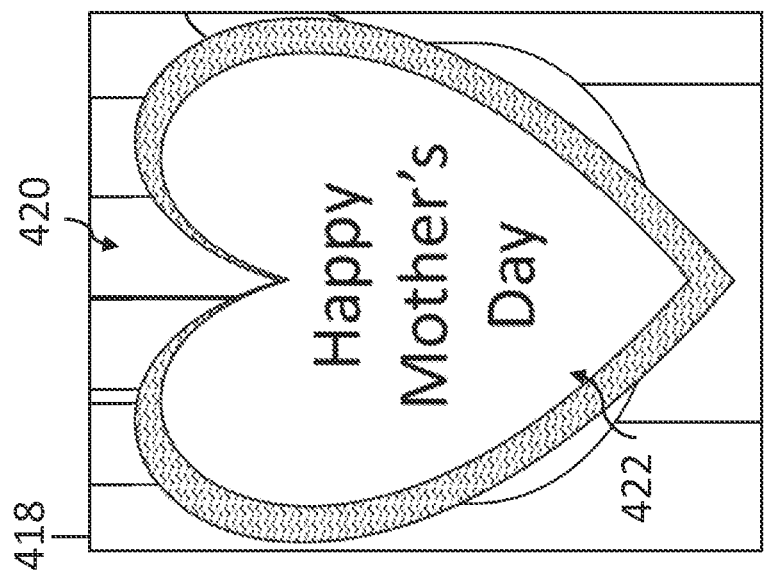
FIGS. 4A, 4B, and 4C are an example of an electronic device limiting a field of view of an image sensor in accordance with various examples.
Figure 4B:
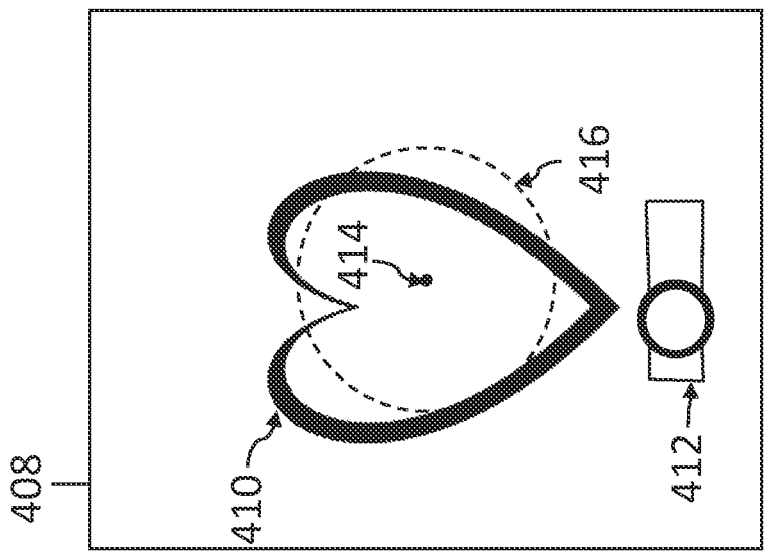
Figure 4A:
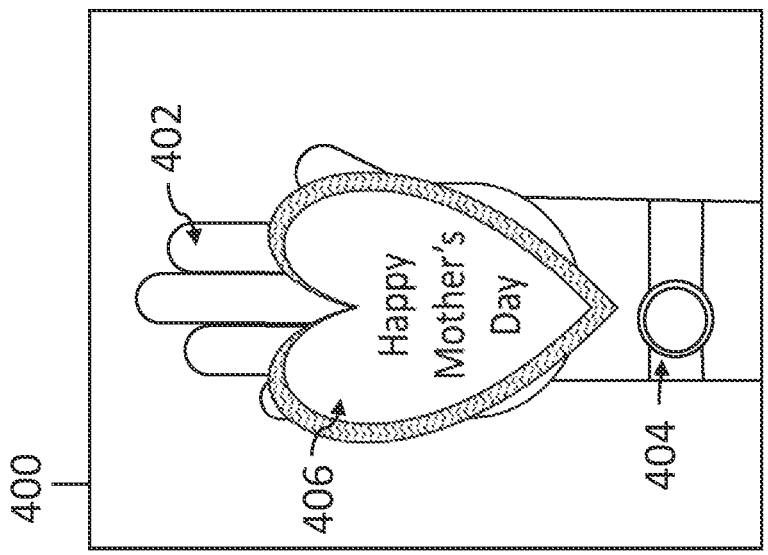

Referring now to FIGS. 4A, 4B, and 4C, an example of an electronic device (e.g., the electronic device 100, 300) limiting a field of view of an image sensor (e.g., the image sensor 106, an image sensor coupled to the connector 306, an image sensor wirelessly coupled to the wireless transceiver 110, 310) is provided, in accordance with various examples. FIG. 4A includes the image 400. The image 400 includes a user hand held in a gesture 402, a wrist ornament 404, and a tangible item 406. The gesture 402 may be the gesture 202, 228. The wrist ornament 404 may be a watch or a bracelet. The tangible item 406 may be the tangible item 204, 230. FIG. 4B includes an image 408. The image 408 includes a first feature 410, a second feature 412, a point 414, and a boundary 416. The first feature 410 may be the feature 210. The point 414 may be the point 214. The boundary 416 may be the boundary 220. FIG. 4C includes the image 418. The image 418 includes a user hand held in a gesture 420 and a tangible item 422. The gesture 420 may be the gesture 202, 228, 402. The tangible item 422 may be the tangible item 204, 230, 406.

As described above with respect to FIG. 3, a processor (e.g., the processor 108, 308) may determine whether the first feature 410 is the object of interest by performing a feature comparison, a frame-by-frame feature comparison, or a combination thereof. The feature comparison may compare a location of the first feature 410 relative to the boundary 416 and a location of the second feature 412 relative to the boundary 416, a dimension of the first feature 410 to a dimension of the second feature 412, the location of the first feature 410 relative to the location of the second feature 412, or a combination thereof. For example, the processor may determine that the first feature 410 is the object of interest because the first feature 410 is located nearer to the point 414 than the second feature 412, because the first feature 410 is located within the boundary 416 and the second feature 412 is not within the boundary 416, because the first feature 410 encompasses a larger area of the field of view than the second feature 412, or some combination thereof. In another example, the processor may determine that the first feature 410 is the object of interest because the second feature 412 is not present in a subsequent sequential frame, because the first feature 410 is located in a different position but still within the boundary 416, or some combination thereof.

Figure 5:
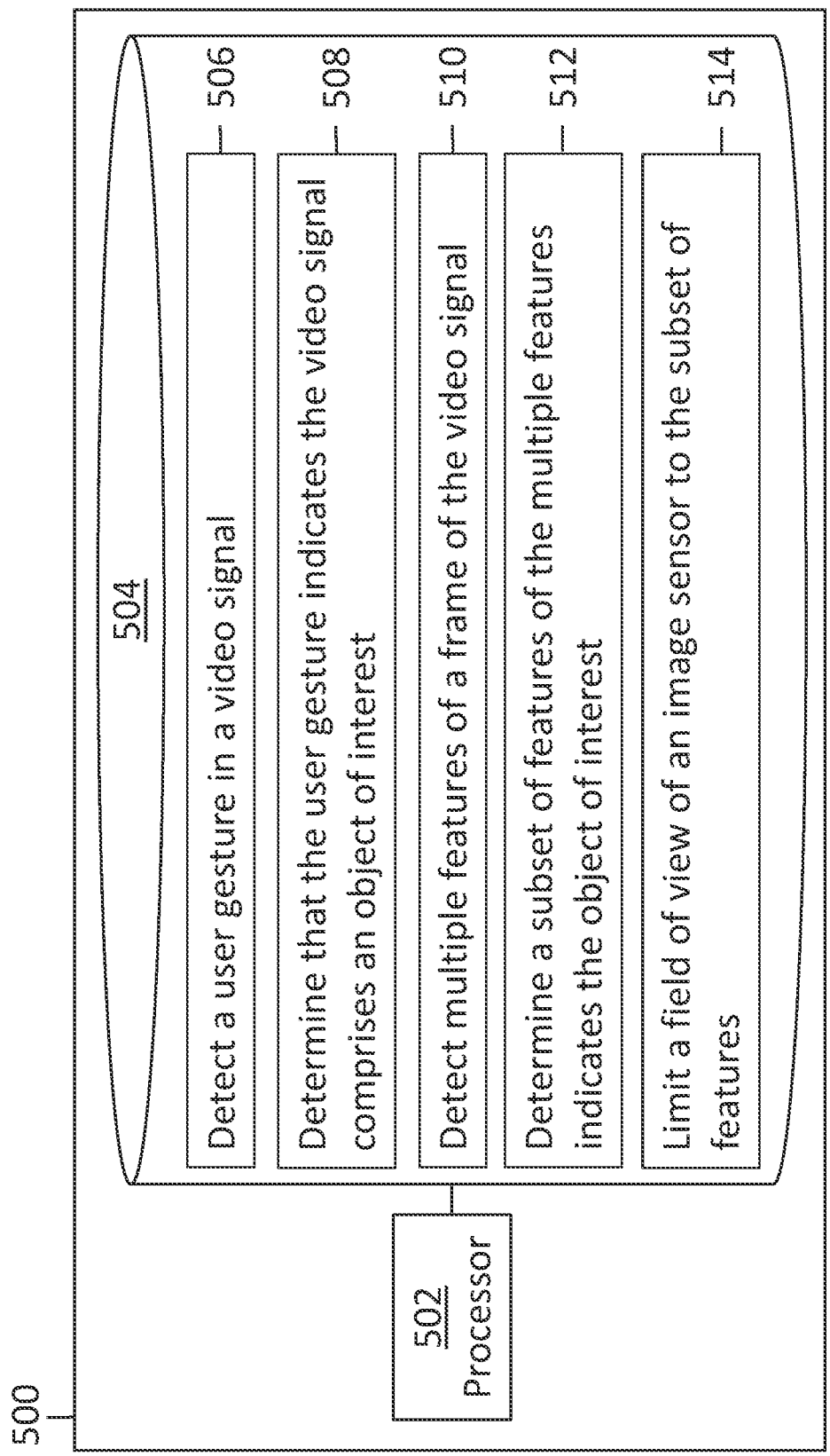
FIG. 5 is a block diagram of an electronic device for limiting a field of view of an image sensor in accordance with various examples.

Referring now to FIG. 5, an electronic device 500 for limiting a field of view of an image sensor (e.g., the image sensor 106) is provided, in accordance with various examples. The electronic device 500 may be the electronic device 100, 300. The electronic device 500 includes a processor 502 and a non-transitory machine-readable medium 504. The processor 502 may be the processor 108, 308. The non-transitory machine-readable medium 504 may be the storage device 112, 312. As described above, the term "non-transitory" does not encompass transitory propagating signals.

In various examples, the processor 502 couples to the non-transitory machine-readable medium 504. The non-transitory machine-readable medium 504 may store machine-readable instructions. The machine-readable instructions may be the machine-readable instructions 506, 508, 510, 512, 514. The machine-readable instructions 506, 508, 510, 512, 514, when executed by the processor 502, may cause the processor 502 to perform some or all of the actions attributed herein to the processor 502.

In various examples, when executed by the processor 502, the machine-readable instructions 506, 508, 510, 512, 514 cause the processor 502 to limit a field of view of the image sensor. The image sensor may be the image sensor 106, an image sensor wirelessly coupled to the wireless transceiver 110, 310, or an image sensor coupled to the connector 306. The machine-readable instruction 506 causes the processor 502 to detect a user gesture (e.g., the gesture 202, 228, 402, 420) in a video signal. The processor 502 may receive the video signal via the image sensor. The machine-readable instruction 508 causes the processor 502 to determine that the user gesture indicates that the video signal includes an object of interest. The machine-readable instruction 510 causes the processor 502 to detect multiple features of a frame of the video signal. The machine-readable instruction 512 causes the processor 502 to determine a subset of features of the multiple features indicates the object of interest. The machine-readable instruction 514 causes the processor 502 to limit the field of view of the image sensor to the subset of features.

In various examples, the processor 502 may detect the multiple features, determine that the user gesture indicates that the video signal includes the object of interest, determine that the subset of features indicates the object of interest, or a combination thereof by utilizing a machine learning technique. In some examples, the processor 502 may utilize a convolutional neural network (CNN) to detect the multiple features. For example, the processor 502 may utilize a region-based CNN (R-CNN). The processor 502 may divide the frame of the video signal into multiple regions. In various examples, the processor 502 may utilize a Region Proposal Network (RPN) to determine the multiple regions. The processor 502 inputs each region into the R-CNN. The processor 502 utilizes a support vector machine technique to determine whether the outputs of the R-CNN include tangible objects. In another example, the processor 502 may utilize a Fast R-CNN. The processor 502 may decompose the frame and then utilizes the decomposed image (e.g., the image 208, 408) as an input into the Fast R-CNN to detect the multiple features.

In some examples, the processor 502 may determine that the subset of features indicates the object of interest by utilizing a machine learning technique to perform object tracking. For example, the processor 502 may utilize a CNN to compare frames having sequential sequences and distinguish background objects from possible objects of interest. In another example, the processor 502 may utilize a CNN to perform a semantic segmentation technique that divides the frame into pixel groupings. The processor 502 utilizes the CNN to identify tangible items of the pixel groupings and features of the tangible items. The processor 502 may utilize the machine learning technique to remove subsets of features of the multiple features that represent background objects. The processor 502 may determine whether a subset of features that remain after removal of the background objects includes the object of interest by determining a proximity of the subset of features to the user. For example, the processor 502 may determine that the subset of features that is nearest the user represents the object of interest.

In other examples, the processor 502 may provide inputs to a machine learning technique that include user gestures that indicated previous video signals included objects of interest, locations of background objects, verbal cues, or a combination thereof. The processor 502 may monitor an audio signal embedded in the video signal for the verbal cue. Utilizing the machine learning technique, the processor 502 may determine that the user gesture that indicates that the video signal includes the object of interest is a position of a finger, a position of a hand, a movement of the finger, a movement of the hand, or a combination thereof. For example, the processor 502 may determine that the user points to an object of interest in a previous video signal and may monitor the video signal for the user pointing. In another example, the processor 502 may determine that a user holds an object of interest in the palm of the user's hand and says, "Look at this," in another previous video signal and may monitor for the user making the user gesture, saying "Look at this," or some combination thereof.

Figure 6B:
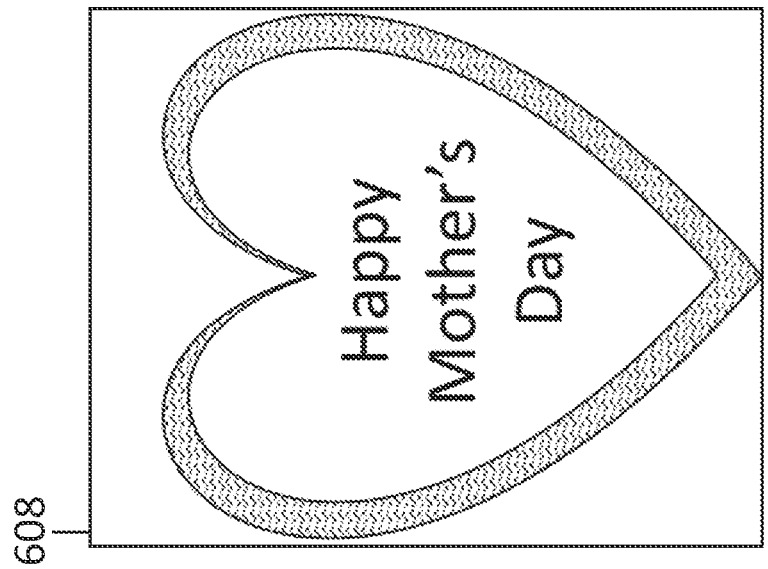
FIGS. 6A and 6B are an example of an electronic device limiting a field of view of an image sensor in accordance with various examples.
Figure 6A:
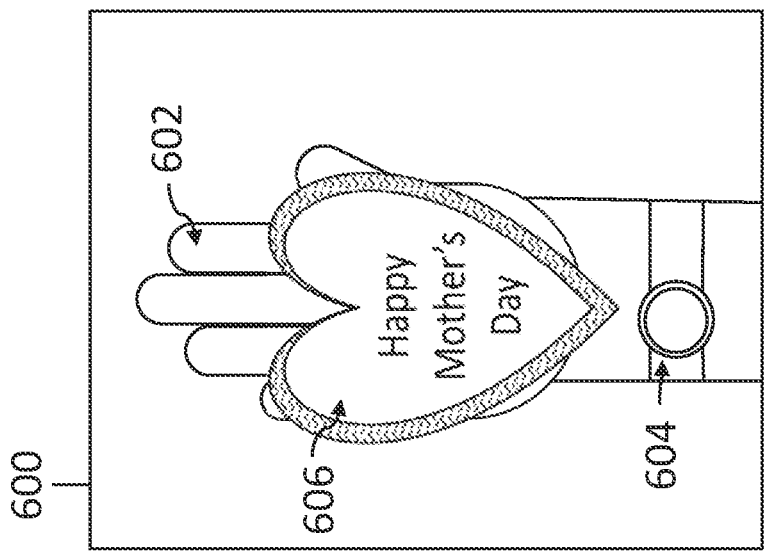

Referring now to FIGS. 6A and 6B, an example of an electronic device (e.g., the electronic device 100, 300, 500) limiting a field of view of an image sensor (e.g., the image sensor 106, an image sensor coupled to the connector 306, an image sensor wirelessly coupled to the wireless transceiver 110, 310) is provided, in accordance with various examples. FIG. 6A includes an image 600. The image 600 includes a user hand held in a gesture 602, a wrist ornament 604, and a tangible item 606. The gesture 602 may be the gesture 202, 228, 402, 420. The wrist ornament 604 may be the wrist ornament 404. The tangible item 606 may be the tangible item 204, 230, 406, 422. FIG. 6B includes an image 608. The image 608 may be a field of view of the image sensor that is limited to an object of interest.

As described above with respect to FIG. 5, utilizing the machine learning technique, a processor (e.g., the processor 108, 308, 502) may determine that the gesture 602 indicates that the video signal includes the object of interest. The processor may decompose a frame of the video signal. The decomposed frame may include features for the wrist ornament 604 and the tangible item 606. The processor may utilize the machine learning technique to determine that the feature representing the tangible item 606 represents the object of interest because the tangible item 606 is located in the palm of the user's hand, because the feature representing the wrist ornament 604 is a background object, or a combination thereof. The processor may utilize a post-processing technique to remove a background of the image 600 of FIG. 6A to limit the field of view of the image sensor to the image 608. Removing the background of the video signal having a field of view limited to an object of interest provides for an enhanced user and audience experience by focusing the user and the audience attention on the object of interest.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein may be shown in exaggerated scale or in somewhat schematic form, and some details of certain elements may not be shown in the interest of clarity and conciseness. In some of the figures, in order to improve clarity and conciseness, a component or an aspect of a component may be omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, as used herein, the word "or" is used in an inclusive manner. For example, "A or B" means any of the following: "A" alone, "B" alone, or both "A" and "B."

What is claimed is:

1. An electronic device, comprising:
   an image sensor; and
   a processor to:
   detect a feature of a frame of a video received via the image sensor;
   determine whether the feature indicates an object of interest by prompting a user to verify that the feature indicates the object of interest, performing a feature comparison, or a combination thereof, wherein performing the feature comparison comprises comparing a location of the feature relative to a central axis of the image sensor, a dimension of the feature to a dimension of a second field of view, or a combination thereof; and
   responsive to a determination that the feature indicates the object of interest, limit a first field of view of the image sensor to the object of interest and overlay the first field of view with the second field of view, the second field of view unlimited.

2. The electronic device of claim 1, wherein the processor is to decompose the frame utilizing image pre-processing techniques to detect the feature.

3. The electronic device of claim 2, wherein the image pre-processing techniques include grayscaling, blurring, thresholding, dilating, erosion, or a combination thereof.

4. An electronic device, comprising:
   an image sensor; and
   a processor to:
   detect multiple features of a frame of a video received via the image sensor;
   determine that a first subset of the multiple features represents a first object and a second subset of the multiple features represents a second object;
   determine whether the first object is an object of interest by prompting a user to verify that the first object indicates the object of interest, performing a feature comparison, or a combination thereof, wherein performing the feature comparison comprises comparing a location of the first subset of the multiple features relative to a central axis of the image sensor, a dimension of the first subset of the multiple features relative to a dimension of a second field of view, or a combination thereof; and
   based on a determination that the first object is the object of interest, limit a field of view of the image sensor to the first object and exclude the second object.

5. The electronic device of claim 4, wherein the processor is to cause a display device to display the limited field of view of the image sensor.

6. The electronic device of claim 4, wherein the processor is to cause a wireless transceiver to transmit a video signal comprising the limited field of view of the image sensor.

7. The electronic device of claim 4, wherein, to determine whether the first object is the object of interest, the processor is to perform a feature comparison by comparing a location of the first object to a location of the second object, a dimension of the first object to a dimension of the second object, the location of the first object relative to a boundary to the location of the second object relative to the boundary, or a combination thereof.

8. The electronic device of claim 4, wherein, to determine whether the first object is the object of interest, the processor is to perform a frame-by-frame feature comparison by determining whether the first object, the second object, or a combination thereof is changing positions between the frame and a subsequent sequential frame.

9. A non-transitory machine-readable medium storing machine-readable instructions which, when executed by a processor of an electronic device, cause the processor to:
   detect a user gesture in a video signal received via an image sensor;

determine that the user gesture indicates that the video signal comprises an object of interest;

detect multiple features of a frame of the video signal;

determine, utilizing a machine learning technique, a subset of features of the multiple features that indicates the object of interest by prompting a user to verify that the subset of features indicates the object of interest, performing a feature comparison, or a combination thereof, wherein performing the feature comparison comprises comparing a location of the subset of features relative to a central axis of the image sensor, a dimension of the subset of features relative to a dimension of a second field of view, or a combination thereof; and limit a field of view of the image sensor to the subset of features.

10. The non-transitory machine-readable medium of claim 9, wherein the processor is to determine that the user gesture indicates that the video signal comprises the object of interest utilizing the machine learning technique.

11. The non-transitory machine-readable medium of claim 9, wherein the processor is to determine, utilizing the machine learning technique, that a second subset of features of the multiple features indicates a background object.

12. The non-transitory machine-readable medium of claim 9, wherein the processor is to perform post-processing techniques to reorient the limited field of view.

13. The non-transitory machine-readable medium of claim 12, wherein the post-processing techniques include warping a perspective, adjusting a resolution, removing a background, or a combination thereof.

* * * * *